(12) United States Patent
Howard et al.

(10) Patent No.: US 12,062,818 B2
(45) Date of Patent: Aug. 13, 2024

(54) ENERGY STORAGE DEVICE

(71) Applicant: Dyson Technology Limited, Wiltshire (GB)

(72) Inventors: Joseph Daniel Howard, Swindon (GB); Michael Edward Rendall, Newbury (GB)

(73) Assignee: Dyson Technology Limited, Malmesbury (GB)

( * ) Notice: Subject to any disclaimer, the term of this patent is extended or adjusted under 35 U.S.C. 154(b) by 692 days.

(21) Appl. No.: 17/261,522

(22) PCT Filed: Jul. 19, 2019

(86) PCT No.: PCT/GB2019/052041
§ 371 (c)(1),
(2) Date: Jan. 19, 2021

(87) PCT Pub. No.: WO2020/016610
PCT Pub. Date: Jan. 23, 2020

(65) Prior Publication Data
US 2021/0273241 A1    Sep. 2, 2021

(30) Foreign Application Priority Data

Jul. 20, 2018  (GB) ..................... 1811882

(51) Int. Cl.
*H01M 6/40*     (2006.01)
*H01M 4/88*     (2006.01)
(Continued)

(52) U.S. Cl.
CPC ........... *H01M 6/40* (2013.01); *H01M 4/8832* (2013.01); *H01M 10/0431* (2013.01); *H01M 10/0562* (2013.01); *H01M 10/0585* (2013.01)

(58) Field of Classification Search
CPC .. H01M 6/40; H01M 4/8832; H01M 10/0431; H01M 10/0562; H01M 10/0585; H01M 4/139; H01M 10/0413
(Continued)

(56) References Cited

U.S. PATENT DOCUMENTS 6,398,824 B1    6/2002  Johnson
6,733,926 B2    5/2004  Muffoletto et al.
(Continued)

FOREIGN PATENT DOCUMENTS

CN    101207019 A    6/2008
CN    101604713 A    12/2009
(Continued)

OTHER PUBLICATIONS

International Search Report and Written Opinion mailed Oct. 9, 2019, directed to International Application No. PCT/GB2019/052041; 14 pages.
(Continued)

*Primary Examiner* — Pamela H Weiss
*Assistant Examiner* — John S Medley
(74) *Attorney, Agent, or Firm* — Tucker Ellis LLP; Michael G. Craig

(57) ABSTRACT

A method for manufacturing an energy storage device. A stack is provided on a substrate. The stack comprises a first electrode layer, a second electrode layer, and an electrolyte layer between the first electrode layer and the second electrode layer. The method includes forming a first groove, a second groove, and a third groove in a first side of the stack opposite to a second side of the stack on the substrate. The first groove has a first depth and a first surface comprising a first exposed surface of the second electrode layer. The second groove has a second depth different from the first depth and a second surface comprising an exposed surface
(Continued)

of the first electrode layer. The third groove has a third depth substantially the same as the first depth and a third surface comprising a second exposed surface of the second electrode layer.

21 Claims, 7 Drawing Sheets

(51) Int. Cl.
  *H01M 10/04* (2006.01)
  *H01M 10/0562* (2010.01)
  *H01M 10/0585* (2010.01)
(58) Field of Classification Search
  USPC .......................................................... 429/124
  See application file for complete search history.

(56) References Cited

U.S. PATENT DOCUMENTS

| 2007/0139001 | A1 | 6/2007 | Hahn | |
| 2008/0032236 | A1* | 2/2008 | Wallace | H01M 10/056 430/319 |
| 2008/0213664 | A1 | 9/2008 | Krasnov et al. | |
| 2011/0275193 | A1 | 11/2011 | Brunton | |
| 2014/0106213 | A1* | 4/2014 | Horikawa | H01M 10/058 429/185 |
| 2015/0102530 | A1 | 4/2015 | Wallace et al. | |
| 2015/0349371 | A1* | 12/2015 | Neudecker | H01M 50/409 429/162 |

FOREIGN PATENT DOCUMENTS

| CN | 104871361 A | 8/2015 |
| CN | 107210324 A | 9/2017 |
| GB | 2474665 A | 4/2011 |
| GB | 2492971 A | 1/2013 |
| GB | 2548361 A | 9/2017 |
| JP | 860-72168 A | 4/1985 |
| JP | 860-72169 A | 4/1985 |
| JP | H4-104478 A | 4/1992 |
| JP | 2000-100471 A | 4/2000 |
| JP | 5371979 B2 | 12/2013 |
| WO | 2009/055529 A1 | 4/2009 |
| WO | 2017158319 A1 | 9/2017 |

OTHER PUBLICATIONS

Search Report dated Sep. 25, 2018, directed GB Application No. GB 1811882.8; 2 pages.

* cited by examiner

ENERGY STORAGE DEVICE

REFERENCE TO RELATED APPLICATIONS

This application is a national stage application under 35 U.S.C. 371 of International Application No. PCT/GB2019/052041, filed Jul. 19, 2019, which claims the priority of United Kingdom Application No. 1811882.8, filed Jul. 20, 2018, the entire contents of each of which are incorporated herein by reference.

FIELD OF THE DISCLOSURE

The present disclosure relates to methods of manufacturing energy storage devices, energy storage devices and intermediate structures for the manufacture of energy storage devices.

BACKGROUND OF THE DISCLOSURE

Energy storage devices such as solid-state thin film cells may be produced by forming a stack of layers on a substrate. The stack of layers typically includes a first electrode layer, a second electrode layer, and an electrolyte layer between the first electrode layer and the second electrode layer. A combination of the stack and the substrate may then be cut into separate sections to form individual cells.

It is desirable to provide a method of manufacturing an energy storage device that is simpler or more efficient than known manufacturing methods.

SUMMARY OF THE DISCLOSURE

According to some embodiments of the present disclosure, there is provided a method for manufacturing an energy storage device, the method comprising:
  providing a stack on a surface of a substrate, the stack comprising a first electrode layer, a second electrode layer, and an electrolyte layer between the first electrode layer and the second electrode layer, the first electrode layer closer than the second electrode layer to the surface of the substrate;
  forming a first groove in a first side of the stack, the first side of the stack opposite to a second side of the stack on the surface of the substrate, the first groove having a first depth and a first surface comprising a first exposed surface of the second electrode layer;
  forming a second groove in the first side of the stack, the second groove having a second depth different from the first depth and a second surface comprising an exposed surface of the first electrode layer; and
  forming a third groove in the first side of the stack, the third groove having a third depth substantially the same as the first depth and a third surface comprising a second exposed surface of the second electrode layer, wherein the second groove is between the first groove and the third groove.

Formation of the first, second and third grooves provides regions into which an electrically insulating material can be deposited. An electrically conductive material may subsequently be deposited to contact exposed surfaces of the first and second electrode layers. The stack may subsequently be divided into multiple cells, for example along axes corresponding to the first, second and third grooves. The electrically conductive material may then be used to connect the first and second electrode layers of a given cell to an external circuit.

Methods in accordance with some embodiments therefore allow multiple cells to be formed from the stack. The method is therefore scalable, and may for example be performed as part of an efficient, continuous manufacturing process such as a roll-to-roll process. Moreover, by forming the first, second and third grooves in the same side of the stack (the first side), the method may be more straightforward than other methods in which grooves are formed from different sides of a stack. For example, the stack may be processed from a single direction, rather than from multiple directions, to form the first, second and third grooves. The apparatus to form the grooves may also be less complex than in other cases in which grooves are formed from different sides of a stack.

In some embodiments, at least one of: the first groove, the second groove, or the third groove are formed without cutting the substrate. This may improve the efficiency of the method compared with methods involving at least partly cutting the substrate during formation of grooves in a stack. For example, a smaller quantity of material may be removed during formation of the first, second or third grooves. The first, second or third grooves may therefore be formed more rapidly, and hence more efficiently, than in other cases in which a larger quantity of material (such as a portion of the substrate) is removed. Furthermore, the formation of the first, second or third grooves may be more straightforward than in other methods involving cutting through the substrate. For example, there may be a disparity in thickness between the substrate and layers of the stack. In some cases, the substrate may be as thick as the layers of the stack combined. It may be difficult to control the depth of a groove formed through such a substrate. However, by forming the first, second and/or third grooves without cutting the substrate, the first, second and third depths of the first, second and third grooves, respectively, may be more easily controlled.

In some embodiments, the first groove is spaced apart from, and substantially parallel to, the second groove and the second groove is spaced apart from, and substantially parallel to, the third groove. This may simplify the formation of the first, second and third grooves. For example, it may be more straightforward to provide a series of substantially parallel grooves than a series of grooves at different respective angles. For example, an angular direction of an apparatus to remove material to form the grooves need not be altered between formation of the first groove and the second groove, or between formation of the second groove and the third groove.

In some embodiments, at least one of: the first depth of the first groove, the second depth of the second groove, or the third depth of the third groove is substantially perpendicular to a plane of the surface of the substrate. By forming the first, second or third grooves in this way, subsequent deposition of electrically insulating material within the first, second or third grooves may be simplified compared with examples in which the first, second or third grooves are angled with respect to the plane of the surface of the substrate. For example, such an arrangement of the first, second or third grooves may encourage or otherwise aid movement of the electrically insulating material into the respective groove and improve contact between the electrically insulating material and an exposed surface within the respective groove (such as an exposed surface of the first or second electrode layer).

In some embodiments, forming the first groove, forming the second groove and forming the third groove uses at least one laser beam directed towards the first side of the substrate. This allows the first, second and third grooves to be formed using a laser ablation process. Laser ablation may be performed rapidly and controlled with relative ease, allowing depths of the first, second and third grooves to be controlled precisely. Moreover, by arranging the at least one laser beam so it is directed towards the first side of the substrate, a laser ablation system may be less complex than in other cases in which there are different laser beams directed towards different sides of the substrate.

In some embodiments, the first groove is formed through the second electrode layer and the electrolyte layer and exposes the first exposed surface of the second electrode layer; the second groove is formed through the second electrode layer, the electrolyte layer and the first electrode layer and exposes the surface of the first electrode layer; and the third groove is formed through the second electrode layer and the electrolyte layer and exposes the second exposed surface of the second electrode layer. This allows a plurality of cells to be manufactured from the same stack. In each of these cells, the first electrode layer and the second electrode layer can be exposed on opposite sides of the cell during subsequent processing, reducing the risk of short circuits occurring.

In some embodiments, the first groove is formed without cutting the first electrode layer and without cutting the substrate; the second groove is formed without cutting the substrate; and the third groove is formed without cutting the first electrode layer and without cutting the substrate. A smaller quantity of material may therefore be removed compared with other cases. This may therefore improve the efficiency of the method.

In some embodiments, an electrically insulating material is provided in at least one of: the first groove, to insulate the first exposed surface of the second electrode layer from the first electrode layer; the second groove, to insulate the exposed surface of the first electrode layer from the second electrode layer; or the third groove, to insulate the second exposed surface of the second electrode layer from the first electrode layer. The electrically insulating material for example reduces the risk of short circuits, which may otherwise occur if the first and second electrode layers come into electrical contact with each other.

In some embodiments, after providing the electrically insulating material in the second groove, a portion of the electrically insulating material is removed to expose a third exposed surface of the second electrode layer. This allows the third exposed surface of the second electrode layer to be subsequently connected to an electrically conductive material, for connection to an external circuit. It may be more straightforward to deposit the electrically insulating material in the second groove and subsequently remove the portion of the electrically insulating material rather than depositing a smaller quantity of the electrically insulating material in the second groove. For example, it may be more difficult to accurately control an amount of the electrically insulating material deposited in the second groove. If too little electrically insulating material is deposited, other layers of the stack than the second electrode layer (such as the electrolyte layer or the first electrode layer) may be exposed, which may lead to short circuits. Conversely, if too much electrically insulating material is deposited, an insufficient amount of the second electrode layer may be exposed, which may reduce electrical contact between the second electrode layer and an electrically conductive material during subsequent processing. This may reduce the effectiveness of the energy storage device. However, by depositing the electrically insulating material in the second groove and subsequently removing the portion of the electrically insulating material, an amount of electrically insulating material remaining in the group may be more precisely controlled.

In some embodiments, the method comprises forming, in the first side of the stack, a first precursor groove, a second precursor groove and a third precursor groove; and providing an electrically insulating material in the first precursor groove, the second precursor groove and the third precursor groove. In such examples, the first groove is formed through the electrically insulating material in the first precursor groove; the second groove is formed through the electrically insulating material in the second precursor groove; and the third groove is formed through the electrically insulating material in the third precursor groove. Formation of the first, second and third precursor grooves for example provides flexibility for subsequent processing.

In some embodiments, the first precursor groove, the second precursor groove and the third precursor groove are formed with substantially the same depth as each other. This may be more straightforward than forming the first, second and third precursor grooves with different depths than each other. For example, the same processing may be applied to the stack to form each of the first, second and third precursor grooves. This may be easier to control than cases in which different processing is applied to the stack to form each of the first, second and third precursor grooves, e.g. to form the first, second and third precursor grooves with different respective depths.

In some embodiments, the stack comprises a further first electrode layer, a further second electrode layer and a further electrolyte layer between the further first electrode layer and the further second electrode layer, the further first electrode layer located between the second electrode layer and the further electrolyte layer. In this way, the stack includes multiple sets of first electrode layer—electrolyte layer—second electrode layer sub-stacks. Such a stack may have a larger ratio of active material to substrate, and may therefore exhibit an increased energy density compared with a stack which includes a single first electrode layer, electrolyte layer and second electrode layer.

In such examples, at least one of:
forming the first groove comprises:
  forming the first groove through the electrically insulating material in the first precursor groove to form the first groove with the first surface comprising first exposed surface of the second electrode layer and such that a first exposed surface of the further second electrode layer is insulated from the first groove by the electrically insulating material; and
  widening the first groove such that the first surface further comprises the first exposed surface of the further second electrode layer;
forming the second groove comprises:
  forming the second groove through the electrically insulating material in the second precursor groove to form the second groove with the second surface comprising the exposed surface of the first electrode layer and such that an exposed surface of the further first electrode layer is insulated from the second groove by the electrically insulating material; and
  widening the second groove such that the second surface further comprises the exposed surface of the further first electrode layer; or forming the third groove comprises:
  forming the third groove through the electrically insulating material in the third precursor groove to form the third groove with the third surface comprising the second exposed surface of the second electrode layer and such that a second exposed surface of the further second electrode layer is insulated from the third groove by the electrically insulating material; and widening the third groove such that the third surface further comprises the second exposed surface of the further second electrode layer.

In these examples, the formation of the first, second or third grooves may be a multi-step process. For example, for the first groove, the first exposed surface of the second electrode layer may be exposed, before subsequently exposing the first exposed surface of the further second electrode layer. In this way, exposed surfaces may be formed for electrode layers of multiple different sub-stacks. This allows a stack including multiple sub-stacks to be formed in an efficient manner. Furthermore, exposed surfaces of the first electrode layer of different sub-stacks may be connected in parallel in a simple way. Similarly, the exposed surfaces of second electrode layer of different sub-stacks may also be connected in parallel. This allows a multi-cell energy storage device to be manufactured efficiently.

In some embodiments, at least one of:
after widening the first groove, a first portion of the first groove is narrower than a second portion of the first groove, the first portion of the first groove closer than the second portion of the first groove to the first side of the substrate;
after widening the second groove, a first portion of the second groove is narrower than a second portion of the second groove, the first portion of the second groove closer than the second portion of the second groove to the first side of the substrate; and
after widening the third groove, a first portion of the third groove is narrower than a second portion of the third groove, the first portion of the third groove closer than the second portion of the third groove to the first side of the substrate.

This for example provides a series of shelf portions within the first, second or third grooves, onto which an electrically conductive material may be deposited. This therefore facilitates the connection of the exposed surfaces within the first, second or third grooves with an electrically conductive material, to allow the electrode layers of the stack to be connected to an external circuit.

In some embodiments, the stack comprises a further first electrode layer, a further second electrode layer and a further electrolyte layer between the further first electrode layer and the further second electrode layer, the further first electrode layer located between the second electrode layer and the further electrolyte layer. In such examples, the first precursor groove, the second precursor groove, and the third precursor groove are each formed through the further second electrode layer, the further electrolyte, the further first electrode layer, the second electrode layer, the electrolyte layer, and the first electrode layer. Hence, the stack may include two sub-stacks, allowing the method to be easily scaled. This may further increase the efficiency of the method for manufacturing an energy storage device. Furthermore, the energy storage device may have a larger energy density than other energy storage devices with a lower ratio of active material to substrate (which is for example an inactive material, which does not contribute to energy storage).

In such examples, at least one of: the first surface comprises a first exposed surface of the further second electrode layer; the second surface comprises an exposed surface of the further first electrode layer; or the third surface comprises a second exposed surface of the further second electrode layer. In this way, the first surface of the first groove may include exposed surfaces of the second and further second electrode layers, which may each be cathodes. Similarly, the second surface of the second groove may include exposed surfaces of the first and further first electrode layers, which may each be anodes. The first and second grooves may be separated from each other by a portion of the stack. Hence, an electrically conductive material connected to the second and further second electrode layers (in the first groove) may be separated from an electrically conductive material connected to the first and further first electrode layers (in the second groove) by the portion of the stack. This for example reduces the risk of short circuits occurring. In a similar manner, a further portion of the stack may separate the second and third grooves, further reducing the likelihood of short circuits.

In some embodiments, a first distance between the first groove and the second groove, in a direction parallel to a plane of the substrate, is substantially the same as a second distance between the second groove and the third groove, in the direction parallel to the plane of the substrate. With this arrangement, the method may be performed more efficiently (for example using standardised, predetermined or otherwise fixed distances between neighbouring grooves) than in other cases in which the distance may vary between neighbouring grooves. Each of the first, second and third groove may correspond with a boundary between neighbouring cells of a multi-cell energy storage device. In such cases, a constant or regular distance between neighbouring grooves facilitates the creation of a z-fold arrangement (by folding an intermediate structure including the stack and the substrate back on itself), from which individual cells may be created by cutting through the intermediate structure, along an axis corresponding to one of the grooves. For example, a regular distance between neighbouring grooves may make it easier to align cells with each other (e.g. in a vertical direction) during the creation of the z-fold arrangement.

In accordance with some embodiments of the present disclosure, there is provided an energy storage device comprising:
a stack on a surface of a substrate, the stack comprising:
a first electrode;
a second electrode; and
an electrolyte between the first electrode and the second electrode, the first electrode closer than the second electrode to the surface of the substrate;
a first electrical insulator in contact with a first exposed surface of the first electrode and a first exposed surface of the electrolyte without contacting at least a portion of a first exposed surface of the second electrode; and
a second electrical insulator in contact with a second exposed surface of the second electrode and a second exposed surface of the electrolyte without contacting at least a portion of a second exposed surface of the first electrode.

Such an energy storage device may be manufactured in an efficient manner, for example using a method in accordance with some embodiments of the present disclosure. The first exposed surface of the second electrode and the second exposed surface of the first electrode may be connected to an external circuit via an electrically conductive material.

In some embodiments, the first electrical insulator is arranged at a first side of the stack and the second electrical insulator is arranged at a second side of the stack, opposite to the first side. In these examples, the first exposed surface of the second electrode may be at the first side of the stack and the second exposed surface of the first electrode may be at the second side of the stack. In this way, the stack itself may separate the first exposed surface of the second electrode from the second exposed surface of the first electrode. At the first side of the stack, the first electrical insulator may insulate the first exposed surface of the first electrode (which may also be at the first side of the stack) from the first exposed surface of the second electrode. Similarly, at the second side of the stack, the second electrical insulator may insulate the second exposed surface of the second electrode (which may also be at the second side of the stack) from the second exposed surface of the first electrode. In this way, short circuits may be effectively prevented or reduced.

In some embodiments, the first side of the stack and the second side of the stack are each substantially perpendicular to a plane of the surface of the substrate. This may simplify the formation of the stack compared with examples in which the first and second sides of the stack are angled with respect to the plane of the surface of the substrate.

In some embodiments, a thickness of the substrate in a direction perpendicular to a plane of the surface of the substrate is substantially the same as or larger than a thickness of the stack in the direction perpendicular to the plane of the surface of the substrate. In such cases, the energy storage device may be manufactured straightforwardly, for example using methods in accordance with some embodiments of the present disclosure. For example, a depth of the first, second and third grooves (which may subsequently be at least partly filled with electrically insulating material, for example to form the first and second electrical insulators) may be more easily controlled.

In some embodiments, the stack comprises: a further first electrode; a further second electrode; and a further electrolyte between the further first electrode and the further second electrode, the further first electrode located between the second electrode and the further electrolyte. In such examples, the energy storage device comprises: a further first electrical insulator in contact with a first exposed surface of the further first electrode and a first exposed surface of the further electrolyte without contacting at least a portion of a first exposed surface of the further second electrode; and a further second electrical insulator in contact with a second exposed surface of the further second electrode and a second exposed surface of the further electrolyte without contacting at least a portion of a second exposed surface of the further first electrode. The stack in such examples may therefore be considered to include multiple sub-stacks. Such a stack for example has a larger energy density than other stacks with solely a single sub-stack. Exposed surfaces of the first electrode of different sub-stacks may be connected in parallel in a simple way, for example using an electrically conductive material. Similarly, the exposed surfaces of second electrode layer of different sub-stacks may also be connected in parallel, for example using an electrically conductive material. This allows a multi-cell energy storage device to be manufactured efficiently. The first, further first, second and further second electrical insulators for example sufficiently various components of the energy storage from one another to avoid or reduce the risk of short circuits. Nevertheless, adequate exposed surfaces are provided so as to enable the stack to be connected effectively to an external circuit.

Further features will become apparent from the following description, given by way of example only, which is made with reference to the accompanying drawings.

DETAILED DESCRIPTION OF THE DISCLOSURE

Details of methods, structures and devices according to some examples/embodiments will become apparent from the following description, with reference to the Figures. In this description, for the purpose of explanation, numerous specific details of certain examples/embodiments are set forth. Reference in the specification to "an example," "an embodiment," or similar language means that a particular feature, structure, or characteristic described in connection with the example is included in at least that one example/embodiment, but not necessarily in other examples/embodiments. It should further be noted that certain examples/embodiments are described schematically with certain features omitted and/or necessarily simplified for ease of explanation and understanding of the concepts underlying the examples/embodiments.

Figure 1:
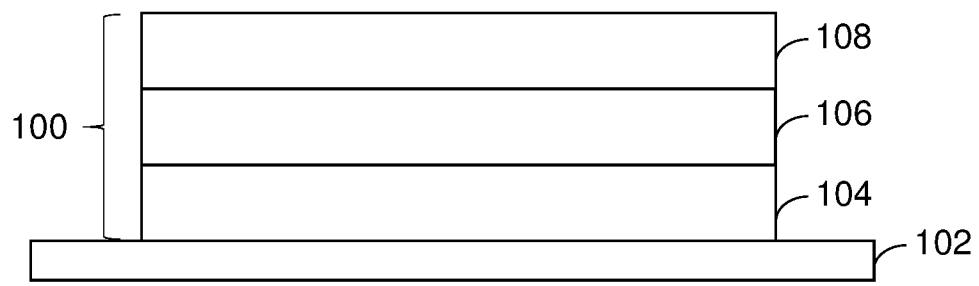
FIG. 1 is a schematic diagram of a stack for an energy storage device according to some embodiments.

FIG. 1 shows a stack 100 of layers for an energy storage device. The stack 100 of FIG. 1 may be used as part of a thin-film energy storage device having a solid electrolyte, for example.

The stack 100 is on a substrate 102 in FIG. 1. The substrate 102 is for example glass or polymer and may be rigid or flexible. The substrate 102 is typically planar. Although the stack 100 is shown as directly contacting the substrate 102 in FIG. 1, there may be one or more further layers between the stack 100 and the substrate 102 in other examples. Hence, unless otherwise indicated, reference herein to an element being "on" another element is to be understood as including direct or indirect contact. In other words, an element on another element may be either touching the other element, or not in contact the other element but, instead, generally supported by an intervening element (or elements) but nevertheless located above, or overlapping, the other element.

The stack 100 of FIG. 1 includes a first electrode layer 104, an electrolyte layer 106 and a second electrode layer 108. In the example of FIG. 1, the second electrode layer 108 is further from the substrate 102 than the first electrode layer 104, and the electrolyte layer 106 is between the first electrode layer 104 and the second electrode layer 108.

The first electrode layer 104 may act as a positive current collector layer. In such embodiments, the first electrode layer 104 may form a positive electrode layer (which may correspond with a cathode during discharge of a cell of the energy storage device including the stack 100). The first electrode layer 104 may include a material which is suitable for storing lithium ions by virtue of stable chemical reactions, such as lithium cobalt oxide, lithium iron phosphate or alkali metal polysulphide salts.

In alternative embodiments, there may be a separate positive current collector layer, which may be located between the first electrode layer 104 and the substrate 102. In these embodiments, the separate positive current collector layer may include nickel foil, but it is to be appreciated that any suitable metal could be used, such as aluminium, copper or steel, or a metalised material including metalised plastics such as aluminium on polyethylene terephthalate (PET).

The second electrode layer 108 may act as a negative current collector layer. The second electrode layer 108 in such cases may form a negative electrode layer (which may correspond with an anode during discharge of a cell of an energy storage device including the stack 100). The second electrode layer 108 may include a lithium metal, graphite, silicon or indium tin oxide (ITO). As for the first electrode layer 104, in other embodiments, the stack 100 may include a separate negative current collector layer, which may be on the second electrode layer 108, with the second electrode layer 108 between the negative current collector layer and the substrate 102. In some embodiments in which the negative current collector layer is a separate layer, the negative current collector layer may include nickel foil. It is to be appreciated, though, that any suitable metal could be used for the negative current collector layer, such as aluminium, copper or steel, or a metalised material including metalised plastics such as aluminium on polyethylene terephthalate (PET).

The first and second electrode layers 104, 108 are typically electrically conductive. Electrical current may therefore flow through the first and second electrode layers 104, 108 due to the flow of ions or electrons through the first and second electrode layers 104, 108.

The electrolyte layer 106 may include any suitable material which is ionically conductive, but which is also an electrical insulator, such as lithium phosphorous oxynitride (LiPON). As explained above, the electrolyte layer 106 is for example a solid layer, and may be referred to as a fast ion conductor. A solid electrolyte layer may have structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two dimensional or three dimensional lattice. Ions of a crystalline material are typically immobile and may therefore be unable to move freely throughout the material.

The stack 100 may for example be manufactured by depositing the first electrode layer 104 on the substrate 102. The electrolyte layer 106 is subsequently deposited on the first electrode layer 104, and the second electrode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo further processing to manufacture an energy storage device. An example of processing that may be applied to the stack 100 of FIG. 1 is illustrated schematically in FIG. 2.

Figure 2:
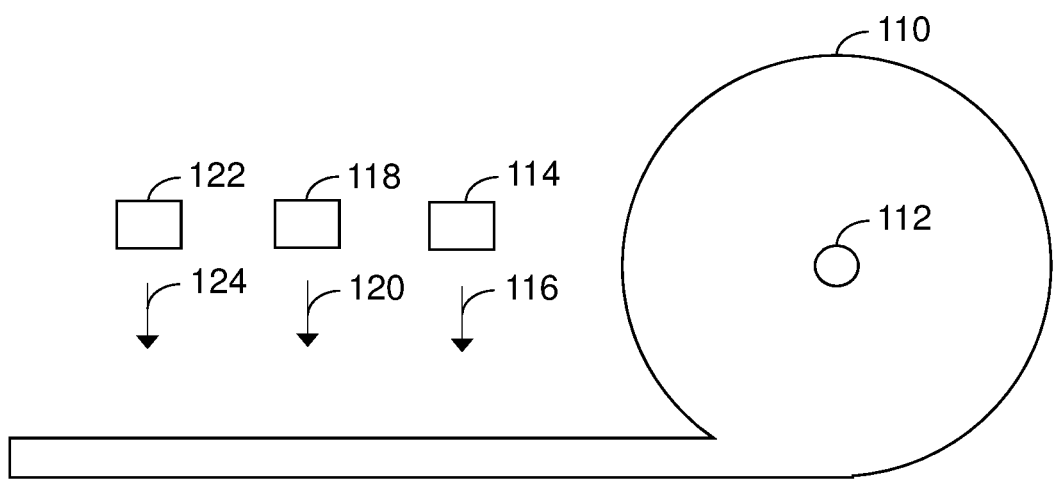
FIG. 2 is a schematic diagram of an example of processing the stack of FIG. 1 for manufacture of an energy storage device according to some embodiments.

In FIG. 2, the stack 100 and the substrate 102 together form an intermediate structure 110 for the manufacture of an energy storage device. The intermediate structure 110 in this example is flexible, allowing it to be wound around a roller 112 as part of a roll-to-roll manufacturing process (sometimes referred to as a reel-to-reel manufacturing process). The intermediate structure 110 may be gradually unwound from the roller 112 and subjected to further processing.

In the example of FIG. 2, grooves may be formed through the intermediate structure 110 (for example through the stack 100) using a first laser 114. The first laser 114 is arranged to apply laser beams 116 to the intermediate structure 110 to remove portions of the intermediate structure, thereby forming grooves in the stack 100. This process may be referred to as laser ablation.

After formation of the grooves, electrically insulating material may be deposited in at least some of the grooves using a material deposition system 118. The material deposition system 118 for example fills at least some of the grooves with a liquid 120 such as an organic suspended liquid material. The liquid 120 may then be cured in the grooves to form electrically insulating plugs in the grooves. An electrically insulating material may be considered to be electrically non-conductive and may therefore conduct a relatively a small amount of electric current when subjected to an electric field. Typically, an electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates one element from another sufficiently for short circuits to be avoided.

Referring to FIG. 2, after deposition of the electrically insulating material, the intermediate structure 110 is cut along at least some of the grooves to form separate cells for an energy storage device. In some embodiments such as FIG. 2, hundreds and potentially thousands of cells can be cut from a roll of the intermediate structure 110, allowing multiple cells to be manufactured in an efficient manner.

In FIG. 2, the cutting operation is performed using a second laser 122, which is arranged to apply laser beams 124 to the intermediate structure 110. Each cut may for example be through the centre of an insulating plug such that the plug is split into two pieces, each piece forming a protective covering over exposed surfaces including edges to which it has attached. Cutting through the entire stack in this way creates exposed surfaces of the first and second electrode layers 104, 108.

Although not shown in FIG. 2 (which is merely schematic), it is to be appreciated that, after deposition of the electrically insulating material, the intermediate structure 110 may be folded back on itself, to create a z-fold arrangement having at least ten, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the first electrode layer 104 (which may be considered to form a first electrode after the cell has been separated from the remainder of the intermediate structure 110), but is prevented from contacting the other layers by the electrically insulating material. Similarly, a second electrical connector on an opposite side of the cell can be arranged in contact with the second electrode layer 108 (which may be considered to form a second electrode after the cell has been separated from the remainder of the intermediate structure 110), but is prevented from contacting the other layers by the insulating material. The insulating material may therefore reduce the risk of a short circuit between the first and second electrode layers 104, 108 and the other layers in each cell. The first and second electrical connectors may, for example, be a metallic material that is applied to the edges of the stack (or to the edges of the intermediate structure 110) by sputtering. The cells can therefore be joined in parallel simply and easily.

FIGS. 3a to 3e (collectively referred to as FIG. 3) are schematic diagrams illustrating features of an example method of manufacturing an energy storage device. Features of FIG. 3 which are the same as corresponding features of FIG. 1 are labelled with the same reference numerals. Corresponding descriptions are to be taken to apply. The same reference numerals are used to denote the same elements in each of FIGS. 3a to 3e. However, not all elements are labelled in each of FIGS. 3a to 3e, for clarity. Elements which are labelled in one of FIGS. 3a to 3e but not in another of FIGS. 3a to 3e may nevertheless be present, as the processing of FIGS. 3a to 3e may be applied sequentially to the same stack.

Figure 3A:
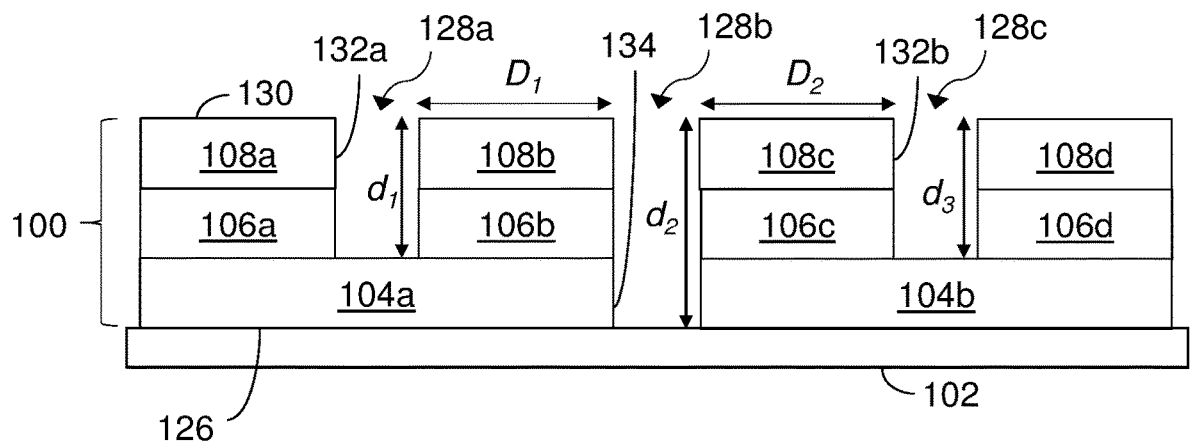
FIGS. 3a to 3e are schematic diagrams illustrating a method of manufacturing an energy storage device according to some embodiments.

Prior to FIG. 3a, methods in accordance with FIG. 3 include providing a stack 100 on a surface 126 of a substrate 102. In this example, the stack 100 and the surface 102 are as shown in FIG. 1. However, in other embodiments, methods in accordance with FIG. 3 may be applied to other stacks with different structures or layers than those shown in FIG. 1.

The layers of the stack 100 (in this case, the first electrode layer 104, the electrolyte layer 106 and the second electrode layer 108) may be provided sequentially. However, in other embodiments, the substrate may be provided partially assembled. For example, a stack including the first electrode layer, the electrolyte layer and the second electrode layer may already be arranged on the substrate before the substrate is provided.

In FIG. 3a, a first groove 128a, a second groove 128b and a third groove 128c are formed in a first side 130 of the stack 100. The first, second and third grooves 128a-128c may be referred to collectively using the reference numeral 128. The first side 130 of the stack 100 is opposite to a second side of the stack 100 which is on the surface 126 of the substrate 102. Hence, the first side 130 of the stack 100 is for example an exposed surface of the stack 100, which is not in contact with or otherwise obscured by another component. In this example, the first side 130 of the stack 100 is an upper surface of the stack 100, although this need not be the case in other examples.

A groove is for example a channel, slot or trench that may be continuous or non-continuous. In some embodiments, a groove may be elongate. A groove may extend partway through the layers of a stack 100, or through all the layers of the stack 100 to expose a portion of the substrate 102. A groove for example provides a channel for subsequent deposition of further materials, such as a liquid or other fluid.

In FIG. 3a, the first groove 128a has a first depth d1, the second groove 128b has a second depth d2 and the third groove 128c has a third depth d3. The first depth d1 is substantially the same as the third depth d3, whereas the first depth d1 is different from the second depth d2. Each of the depths d1, d2, d3 of the grooves 128 are taken in a direction substantially perpendicular to a plane of the surface 126 of the substrate 102 in FIG. 3a. A direction may be considered substantially perpendicular to a plane where the direction is exactly perpendicular to the plane or approximately perpendicular to the plane, such as within measurement tolerances or with an angular deviation of within plus or minus 5, 10 or 20 degrees from perpendicular. In such cases, the grooves 128 may be considered to extend or be otherwise elongate in this direction. In these cases, the grooves 128 may additionally be elongate in a different direction, such as in a direction perpendicular to this (such as a direction into or out of the page with reference to FIG. 3a). For example, a central axis of a groove, which extends from a mouth or opening of the groove towards a base of the groove, may be in the direction substantially perpendicular to the plane of the surface 126 of the substrate 102.

However, in other examples, some or all of the grooves 128 may extend along an axis which is at a different angle with respect to the plane of the surface 126 of the substrate 102 than substantially perpendicular. For example, some or all of the grooves 128 may have an inner surface which is at an acute angle (such as an angle of less than 90 degrees) with respect to the plane of the surface 126 of the substrate 102. However, this may make it more difficult to deposit materials within the grooves 128 subsequently compared with examples such as FIG. 3a, in which the inner surfaces of the grooves 128 are substantially perpendicular to the plane of the surface 126 of the substrate 102.

The first, second and third grooves 128a, 128b, 128c separate the various layers of the stack 100 into different portions. In FIG. 3a, the first groove 128a separates the first electrode layer 108 into a first and second portion 108a, 108b. The first groove 128a also separates the electrolyte layer 106 into a first and second portion 106a, 106b. The second groove 128b separates the second portion 108b of the first electrode layer 108 from a third portion 108c of the first electrode layer 108. The second groove 128b also separates the second portion 106b of the electrolyte layer 106 from a third portion 106c of the electrolyte layer 106. In addition, the second groove 128b separates the second electrode layer 104 into a first portion 104a and a second portion 104b. In FIG. 3a, the third groove 128c separates the third portion 108c of the first electrode layer 108 from a fourth portion 108d of the first electrode layer 108, and separates the third portion 106c of the electrolyte layer 106 from a fourth portion 106d of the electrolyte layer 106. Unlike the second groove 128b, neither the first groove 128a nor the third groove 128c separates portions of the second electrode layer 104.

In FIG. 3a, the first groove 128a has a first surface which includes a first exposed surface 132a of the second electrode layer 108. In this example, the first exposed surface 132a of the second electrode layer 108 is a surface of the first portion 108a of the second electrode layer 108. However, the first surface of the first groove 128a also includes exposed surfaces of the second portion 108b of the second electrode layer 108, and the first and second portions 106a, 106b of the electrolyte layer 106. The first surface of the first groove 128a additionally includes an exposed surface of the first portion 104a of the first electrode layer 104, which in this example is an upper surface of the first portion 104a of the first electrode layer 104. Hence, in this example, the first groove 128a is formed through the second electrode layer 108 and the electrolyte layer 106. The exposed surfaces of the second electrode layer 108 and the electrolyte layer 106 therefore form sides of the first groove 128a, whereas the exposed surface of the first electrode layer 104 forms a base or bottom region of the first groove 128a. The first groove 128a does not extend through the first electrode layer 104 or the substrate 102.

An exposed surface of a groove is for example a surface that is not covered or otherwise in contact with another layer after formation of the groove. In this way, an exposed surface is for example uncovered, revealed or otherwise on display after formation of the groove. An exposed surface may for example correspond with a wall, side, side wall or face of the groove. Hence, an exposed surface may be or include any surface within the groove, which is uncovered. For example, an exposed surface may be or include a vertical wall of the groove or a generally upwardly extending inner surface of the groove, which extends in an upward direction with respect to the substrate 102. This is the case in FIG. 3a, in which the first surface of the first groove 128a (which is for example an exposed surface of the first groove 128a) includes a side of the first and second portions 108a, 108b of the first electrode layer 108 and a side of the first and second portions 106a, 106b of the electrolyte layer 106. Alternatively, an exposed surface may be or include a horizontal wall of the groove or a wall or other surface of the groove which extends in a plane which is generally parallel to the horizontal or to a plane of the surface 126 of the substrate 102. For example, an exposed surface may be or include a horizontal bottom surface of the groove, which is for example a deepest surface of the groove, which may be closest to the substrate 102. In other embodiments, the groove may include one or more shelf or ledge portions, which may extend in a plane which is generally parallel to the horizontal or to a plane of the substrate.

The second groove 128b has a second surface which includes an exposed surface 134 of the first electrode layer 104. In this example, the exposed surface 134 of the first electrode layer 104 is a surface of the first portion 104a of the first electrode layer 104 (in this example, a surface of a side of the first portion 104a of the first electrode layer 104, which extends away from the plane of the surface 126 of the substrate 102). However, the second surface of the second groove 128b also includes exposed surfaces of the second and third portions 106b, 106c of the electrolyte layer 106 and exposed surfaces of the second and third portions 108b, 108c of the second electrode layer 108. Hence, in this example, the second groove 128b is formed through the second electrode layer 108, the electrolyte layer 106 and the first electrode layer 104, which for example form sides of the second groove 128b. The second groove 128b does not extend through the substrate 102, although the surface 126 of the substrate 102 in FIG. 3a corresponds with a base of the second groove 128b. The second groove 128b is located between the first groove 128a and the third groove 128c.

The third groove 128c has a third surface which includes a second exposed surface 132b of the second electrode layer 108. In this example, the second exposed surface 132b of the second electrode layer 108 is a surface of the third portion 108c of the second electrode layer 108. However, the third surface of the third groove 128c also includes an exposed surface of the third portion 106c of the electrolyte layer 106 as well as exposed surfaces of the fourth portions 108d, 106d of the second electrode layer 108 and the electrolyte layer 106. The third surface of the third groove 128c also includes an exposed surface of the second portion 104b of the second portion 104b of the first electrode layer 104, which for example corresponds with a base of the third groove 128c. Hence, in this example, the third groove 128c is formed through the second electrode layer 108 and the electrolyte layer 106, which for example form sides of the third groove 128c. The third groove 128c does not extend through the first electrode layer 104 or the substrate 102 though.

Due to the first and third depths d1, d3 of the first and third grooves 128a, 128c being different from the second depth d2 of the second groove 128b, the second groove 128b extends through the first electrode layer 104, whereas the first and third grooves 128a, 128c are not sufficiently deep to extend through the first electrode layer 104. This exposes side surfaces of the second electrode layer 108 within the first and third grooves 128a, 128c (which may be considered to be inner surfaces or side walls of the first and third grooves 128a, 128c). A side surface of the first electrode layer 104 is not exposed within the first and third grooves 128a, 128c. Instead, an upper surface of the first electrode layer 104 forms a base of the first and third grooves 128a, 128c. However, side surfaces of the first electrode layer 104 are exposed within the second groove 128b, which is deeper than the first and third grooves 128a, 128c. In other embodiments, though, side surfaces of the same layers may be exposed in each of the grooves, with side surfaces of different portions of the same layers being exposed in different ones of the grooves. However, the first and third grooves in such cases may nevertheless have substantially the same depth as each other, but a different depth than the second groove.

In FIG. 3a, the first groove 128a is spaced apart from, and substantially parallel to, the second groove 128b, and the second groove 128b is spaced apart from, and substantially parallel to, the third groove 128c. Two grooves may be considered to be substantially parallel to each other where they are exactly parallel to each other or where they are parallel to each other within manufacturing tolerances, or within less than 20 degrees, 15 degrees, 10 degrees or 5 degrees. In other words, the first, second and third grooves 128 each extend in generally the same direction as each other. This may simplify formation of the first, second and third grooves 128.

In FIG. 3a, the grooves 128 have a substantially constant or otherwise uniform cross-section. The cross-section of a groove is for example taken in a direction perpendicular to a depth of the groove, and may therefore correspond with a width of the groove. In FIG. 3a, the grooves 128 are cylindrical in shape. However, in other embodiments, the grooves may have different shapes. For example, a cross-section of a groove may increase or decrease in size away from a base of the groove or may be non-uniform in size. Some or all of the grooves 128 may have substantially the same width as each other, such as precisely the same width or the same width within manufacturing tolerances or with a deviation of less than 20%, 15%, 10% or 5%. It may be more straightforward to manufacture the grooves 128 with the same width as each than with different widths. For example, this may obviate a need to adjust manufacturing equipment in between formation of neighbouring grooves, which may be otherwise needed to form grooves of different widths. A width of a groove may be taken in a direction parallel to a plane of the surface 126 of the substrate 102, which may be perpendicular to the depth of a groove. In other embodiments, though, one or more of the grooves may have a different width and/or shape than another of the grooves.

In example such as FIG. 3a, a first distance D1 between the first groove 128a and the second groove 128b, in a direction parallel to a plane of the surface 126 of the substrate 102, is substantially the same as a second distance D2 between the second groove 128b and the third groove 128c, in the same direction. Two distances may be considered substantially the same where they are exactly the same, the same within measurement uncertainties or within 20%, 15%, 10% or 5% of each other, for example. With this arrangement, the grooves 128 may be manufactured more straightforwardly than in other cases in which the grooves 128 are formed at irregular intervals. Furthermore, this may make it easier to align the grooves with each other in a z-folding arrangement.

Some or all of the grooves may be formed using laser ablation. Laser ablation may refer to the removal of material from the stack 100 using a laser-based process. The removal of material may include any one of multiple physical processes. For example, the removal of material may include (without limitation) any one or a combination of melting, melt-expulsion, vaporisation (or sublimation), photonic decomposition (single photon), photonic decomposition (multi-photon), mechanical shock, thermo-mechanical shock, other shock-based processes, surface plasma machining, and removal by evaporation (ablation). Laser ablation for example involves irradiating a surface of a layer (or layers) to be removed with a laser beam. This for example causes a portion of the layer (or layers) to be removed. The amount of a layer removed by laser ablation may be controlled by controlling properties of the laser beam such as the wavelength of the laser beam or a pulse length of a pulsed laser beam. Laser ablation typically allows the formation of the groove to be controlled in a straightforward and rapid manner. However, in other examples, alternative methods may be used to form some or all of the grooves, such as photolithographic techniques.

In some embodiments in which laser ablation is used, the grooves 128 may be formed using at least one laser beam directed towards the first side of the substrate 102, which for example corresponds with the surface 126 of the substrate 102 on which the stack 100 is arranged. For example, the at least one laser beam may be directed towards the first side 130 of the stack 100. By virtue of directing the at least one laser beam towards the first side 130 of the stack 100, the at least one laser beam may thereby be directed towards the first side of the substrate 102. To direct at least one laser beam towards the first side of the substrate 102, a laser arranged to produce the at least one laser beam may itself be located at the first side of the substrate 102 (for example facing the first side 130 of the stack 100). Alternatively, though, the at least one laser beam may be located in a different position, but may nevertheless be directed towards the first side of the substrate 102 using a suitable optical arrangement. For example, the at least one laser beam may be produced using a laser ablation system comprising a laser and an optical element, such as a mirror or other reflector, to deflect at least one laser beam generated by the laser towards the first side of the substrate 102.

In this way, the grooves 128 may be formed by applying the at least one laser beam from a single side of the stack 100. This may simplify formation of the grooves 128 compared with cases in which laser beams are applied from different respective sides of the stack 100.

As can be seen from FIG. 3a, the first groove 128a, the second groove 128b and/or the third groove 128c may be formed without cutting the substrate 102. In some embodiments, the substrate 102 may relatively thick compared to the stack 100. For example, a thickness of the substrate 102 in a direction perpendicular to a plane of the surface 126 of the substrate 102 is substantially the same as or larger than a thickness of the stack 100 in the same direction, where substantially the same, for example, refers to the thicknesses being precisely the same, the same within manufacturing tolerances or generally similar such as within 20%, 15%, 10% or 5% of each other. In such cases, it may be more straightforward to control a depth of a groove by cutting the groove from the first side 130 of the stack 100 without cutting the substrate 102, than cutting the groove through the substrate 102 and into the stack 100.

In FIG. 3a, the first and third grooves 128a, 128c are formed without cutting the first electrode layer 108 and the substrate 102. The second groove 128b is formed without cutting the substrate 102. This for example improves the efficiency of the formation of the grooves 128, while still producing grooves 128 with a shape or size that are appropriate for formation of an energy storage device, compared with other examples in which additional material is removed.

Figure 3B:
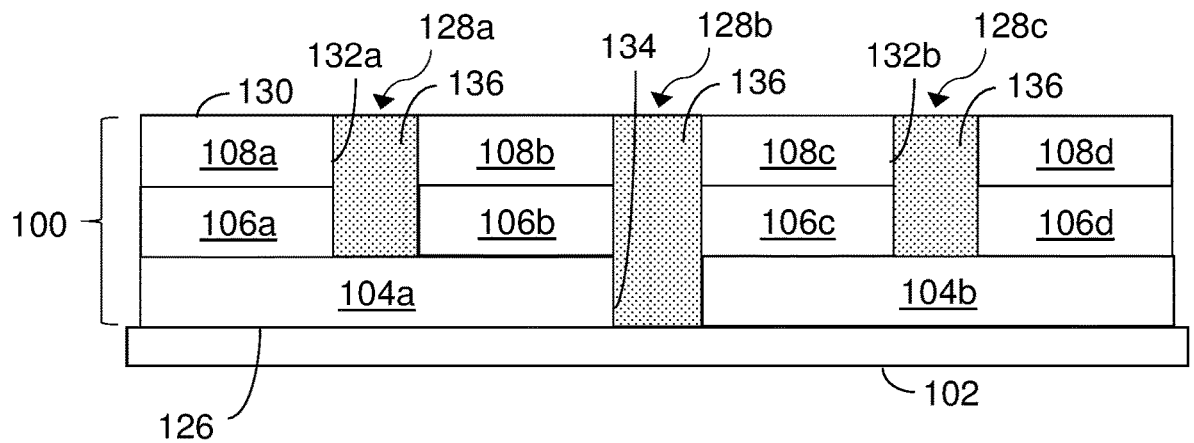

In FIG. 3b, an electrically insulating material 136 is deposited in the first, second and third grooves 128 (although in some cases electrically insulating material may not be deposited in one or more of the grooves 128). The electrically insulating material 136 may be provided as a first liquid, for example using an inkjet material deposition process, such as an inkjet printing process. This for example involves ejecting or otherwise propelling drops of the electrically insulating material 136, e.g. from nozzles, into the grooves 128. The electrically insulating material 136 may be an ink, such as a dielectric ink. A suitable dielectric ink is DM-INI-7003, available from Dycotec Materials Ltd., Unit 12 Star West, Westmead Industrial Estate, Westlea, Swindon, SN5 7SW, United Kingdom. In general, the electrically insulating material 126 may be any suitable dielectric material. A dielectric material is for example an electrical insulator which may be polarized upon application of an electric field. Such a dielectric material typically also has a low electrical conductivity. Although in FIG. 3b the same electrically insulating material 136 is deposited in each of the grooves 128, it is to be appreciated that, in other examples, a different electrically insulating material may be deposited in one or more of the grooves 128.

Depositing the electrically insulating material 136 in the first groove 128a insulates the first exposed surface 132a of the second electrode layer 108 from the first electrode layer 104. Similarly, depositing the electrically insulating material 136 in the second groove 128b insulates the exposed surface 134 of the first electrode layer 104 from the second electrode layer 108. Depositing the electrically insulating material 136 in the third groove 128c insulates the second exposed surface 132b of the second electrode layer 108 from the first electrode layer 104. In this way, the risk of short circuits between the first and second electrode layers 104, 108 may be reduced.

After providing the electrically insulating material 136 in the second groove 128b, a portion of the electrically insulating material 136 may be removed. This is shown schematically in FIG. 3c. The portion of the electrically insulating material 136 may be removed using the same apparatus or system as that used for formation of the grooves 128 or using different apparatus or system that nevertheless applies the same processing as that used to form the grooves 128. For example, the portion of the electrically insulating material 136 may be removed using laser ablation. However, other methods are possible. For example, a different method may be used to create the grooves 128 and to remove the portion of the electrically insulating material 136, as the skilled person will appreciate.

Figure 3C:
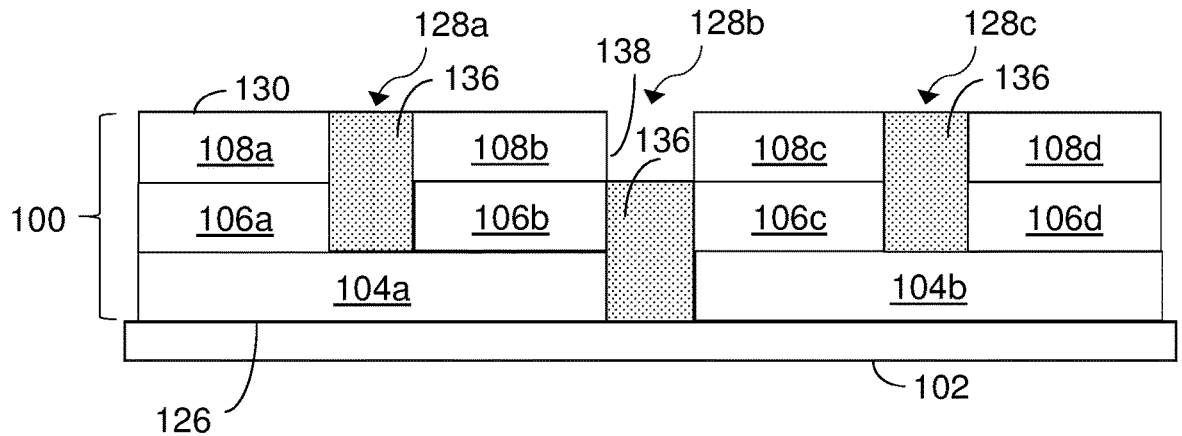

By removing the portion of the electrically insulating material 136, a third exposed surface 138 of the second electrode layer 108 is exposed. In FIG. 3c, the third exposed surface 138 of the second electrode layer 108 is a surface of the second portion 108b of the second electrode layer 108, although this is merely an example. In addition to exposing the surface of the second portion 108b of the second electrode layer 108, a surface of the third portion 108c of the second electrode layer 108 is also exposed in the example of FIG. 3c (although this need not be the case). An electrically conductive material may subsequently be deposited to contact the third exposed surface 138 of the second electrode layer 108, to connect the second electrode layer 108 to an external circuit.

Figure 3D:
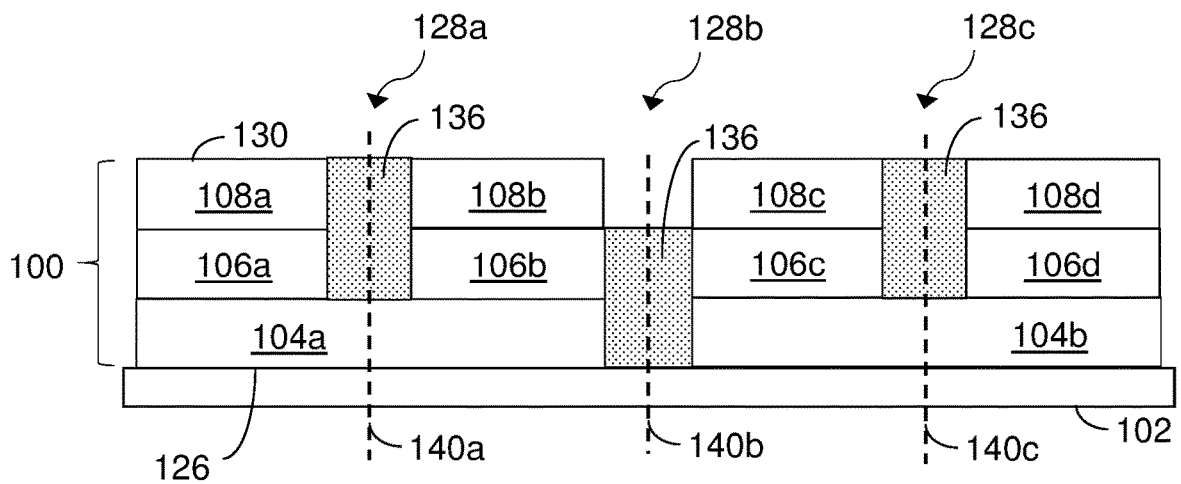

After deposition of the electrically insulating material 136, a cutting procedure may be applied, as shown in FIG. 3d. In FIG. 3d, an intermediate structure of the stack 100 and the substrate 126 is cut along a first axis 140a aligned with the first groove 128a, a second axis 140b aligned with the second groove 128b and a third axis 140c aligned with the third groove 128c. The axes may be referred to collectively with the reference numeral 140. In this example, the axes 140 are each aligned with a centre of a respective groove 128, although in other cases such axes may not be aligned in this way. As noted with reference to FIG. 2, the cutting operation may be performed using a laser, although this is merely an example. By cutting the intermediate structure in this way, the intermediate structure may be separated into individual cells.

Figure 3E:
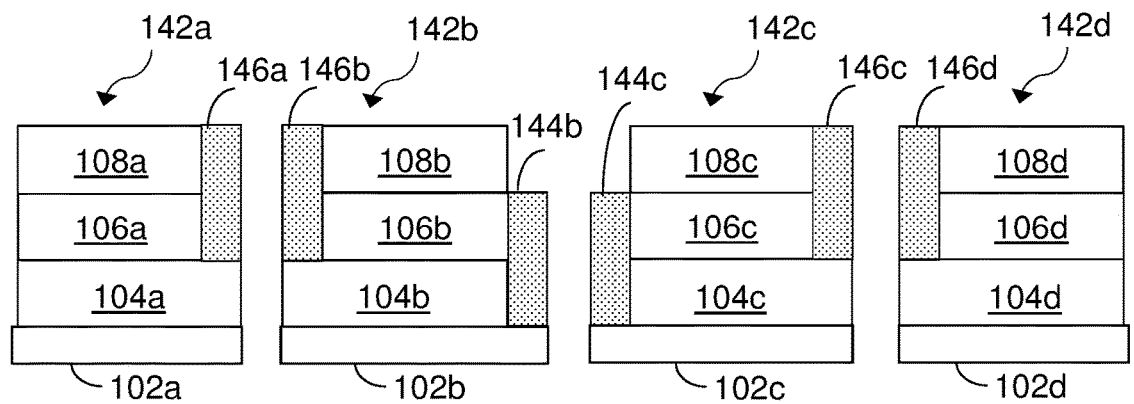

Cutting the intermediate structure as shown in FIG. 3d allows cells 142 for an energy storage device to be formed, as shown in FIG. 3e. In FIG. 3e, four cells 142a-142e are formed, although typically a much larger number of cells may be formed from a stack 100. The first cell 142a includes the first portion 108a of the second electrode layer 108 (which be considered to correspond to a second electrode), the first portion 106a of the electrode layer 106 (which may be considered to correspond to an electrolyte), the first portion 104a of the first electrolyte layer 104 (which may be considered to correspond to a first electrode), and a first portion 102a of the first substrate 102. The second, third and fourth cells 142b, 142c, 142d include similar layers to the first cell 142a. Components of the second, third and fourth cells 142b, 142c, 142d which are similar to corresponding components of the first cell 142a are labelled with the same reference numeral but appended by a "b", "c" or "d", respectively, rather than an "a".

In FIG. 3e, a first electrical insulator is in contact with an exposed surface of a portion of the first electrode layer 104 and an exposed surface of a portion of the electrolyte layer 106 without contacting at least a portion of an exposed surface of a portion the second electrode layer 108. The first electrical insulator is labelled in FIG. 3e with the reference numeral 144 appended by an "a", "b", "c" or "d" depending on whether it is associated with the first, second, third or fourth cell 142a-142d respectively. A second electrical insulator is in contact with an exposed surface of a portion of the second electrode layer 108 and an exposed surface of a portion of the electrolyte layer 106 without contacting at least a portion of an exposed surface of the first electrode layer 104. The second electrical insulator is labelled in FIG. 3e with the reference numeral 146 appended by an "a", "b", "c" or "d" depending on whether it is associated with the first, second, third or fourth cell 142a-142d respectively In FIG. 3e, the first cell 142a and the fourth cell 142d include second electrical insulators 146a, 146d but are lacking first electrical insulators. Nevertheless, the first and fourth cells 142a, 142d may undergo further processing to add a first electrical insulator, which may be similar to the first electrical insulators 144b, 144c of the second and third cells 142b, 142c.

The function of the first and second electrical insulators 144b, 146b will now explained with reference to the second cell 142b. In FIG. 3e, the first electrical insulator 144b of the second cell 142b contacts an exposed surface of the second portion 104b of the first electrode layer 104b and an exposed surface of the second portion 106b of the electrolyte layer 106. The first electrical insulator 144b therefore insulates the second portion 104b of the first electrode layer 104b from the second portion 108b of the second electrode layer 108b. The second electrical insulator 146b of the second cell 142b also insulates the second portion 104b of the first electrode layer 104b from the second portion 108b of the second electrode layer 108b. However, the second electrical insulator 146b of the second cell 142b does this by contacting an exposed surface of the second portion 106b of the electrolyte layer 106 and an exposed surface of the second portion 108b of the second electrode layer 108.

In this example, the first electrical insulator 144b is arranged at a first side of the second cell 142b, and the second electrical insulator 146b is arranged at a second side of the second cell 142b, opposite to the first side. A side of a cell for example corresponds with a side of a stack of the cell. An electrical insulator may be considered to be arranged at a side of a cell or stack where the electrical insulator contacts at least a portion of an exposed surface of that side of the cell or stack. For example, the electrical insulator may extend along that side of the cell or stack (although it need not). In some embodiments, such as that of FIG. 3e, the first side of a cell or stack and the second side of the cell or stack may each substantially perpendicular to a plane of the surface 126 of the substrate 102. In such cases, the first or second side of the cell or stack need not itself be planar and may have a non-planar surface. Nevertheless, the first or second side may be generally or approximately perpendicular to the plane of the surface 126, such that a centre plane of the first or second side is perpendicular to the plane of the surface, precisely, within manufacturing tolerances or within 20 degrees, 15 degrees, 10 degrees or 5 degrees. In such cases, the first or second electrical insulators 144b, 146b may extend generally away from the surface 126 of the substrate 102. For example, the first or second electrical insulators 144b, 146b may extend approximately vertically, to cover a portion of a side face of the stack of the second cell 142b.

With this arrangement, an exposed surface of the second portion 104b of the first electrode layer 104 of the second cell 142b remains uncovered by the second electrical insulator 146b. An exposed surface of the second portion 108b of the second electrode layer 108 of the second cell 142b is also uncovered by the first electrical insulator 144b. In this way, the exposed portions of the first and second electrode layers 104, 108 are on opposite sides of the second cell 142b. This allows the first and second electrode layers 104, 108 to be connected to an external circuit by arranging electrically conductive material on opposite sides of the second cell 142b, and in contact with the exposed portions of the first and second electrode layers 104, 108. This therefore reduces the risk of short circuits between the first and second electrode layers 104, 108 occurring.

The third cell 142c of FIG. 3e is a mirror image of the second cell 142b. In this way, the second groove 128b of FIG. 3c can be filled with electrically insulating material 136 which, upon cutting, and division into two, forms the first electrical insulators 144b, 144c of the second and third cells 142b, 142c. The third cell 142c may be connected to an external circuit similarly to the second cell 142b.

A plurality of cells similar to the cells 142 of FIG. 3e may be connected in parallel to form a multi-cell energy storage device. For example, a first electrical connector may be used to connect each of a plurality of first electrode layers to each other, and a second electrical connector may be used to connect each of a plurality of second electrode layers to each other. The first and second electrical connectors may therefore provide contact points for terminals of an energy storage device. For example, the first and second electrical connectors may provide contact points for negative and positive terminals of the energy storage device, respectively. The negative and positive terminals may be electrically connected across a load to power the load, thereby providing a multi-cell energy storage device.

FIGS. 4a to 4f (collectively referred to as FIG. 4) are schematic diagrams which show a method of manufacturing an energy storage device according to further examples. Features of FIG. 4 which are similar to corresponding features of FIGS. 3a to 3e are labelled with the same reference number, incremented by 100. Corresponding descriptions are to be taken to apply. The same reference numerals are used to denote the same elements in each of FIGS. 4a to 4f. However, not all elements are labelled in each of FIGS. 4a to 4f, for clarity. Elements which are labelled in one of FIGS. 4a to 4f but not in another of FIGS. 4a to 4f may nevertheless be present, as the processing of FIGS. 4a to 4f may be applied sequentially to the same stack.

Figure 4A:
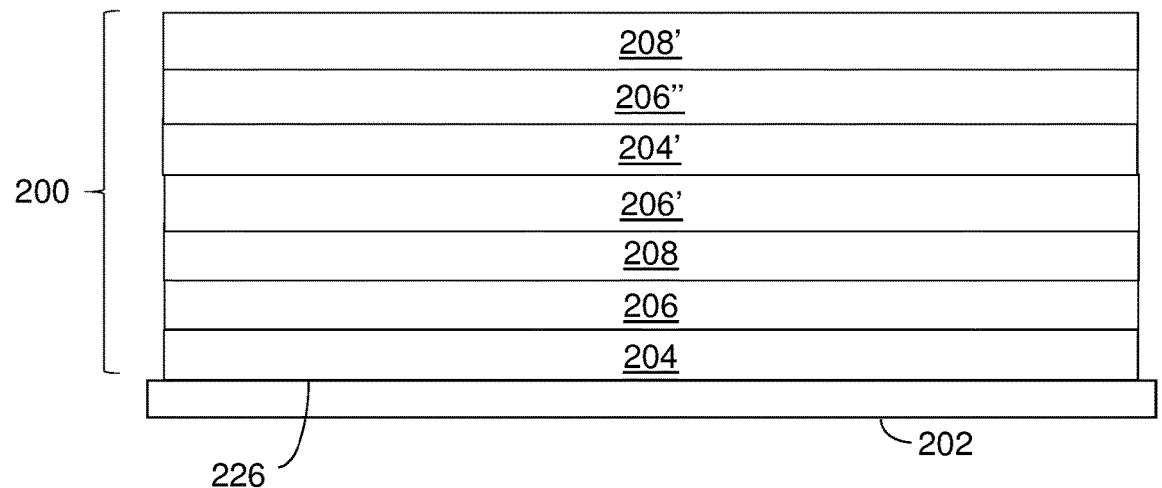
FIGS. 4a to 4f are schematic diagrams illustrating a method of manufacturing an energy storage according to further examples.

In FIG. 4a, a stack 200 is provided on a substrate 202. The stack 200 includes a first electrode layer 204, an electrode layer 206, and a second electrode layer 208. However, the stack 200 also includes, on top of the second electrode layer 208, a further series of layers. In this example, the further series of layers includes a two further electrolyte layers 206', 206", a further first electrode layer 204' and a further second electrode layer 208'. A first further electrolyte layer 206' separates the further first electrode layer 204' from the second electrode layer 208. A second further electrolyte layer 206" separates the further second electrode layer 208' from the first electrode layer 204'. Elements with the same reference numeral but appended with an apostrophe ' or a double apostrophe " may be the same as corresponding element without this appendment. Corresponding descriptions are to be taken to apply.

Figure 4B:
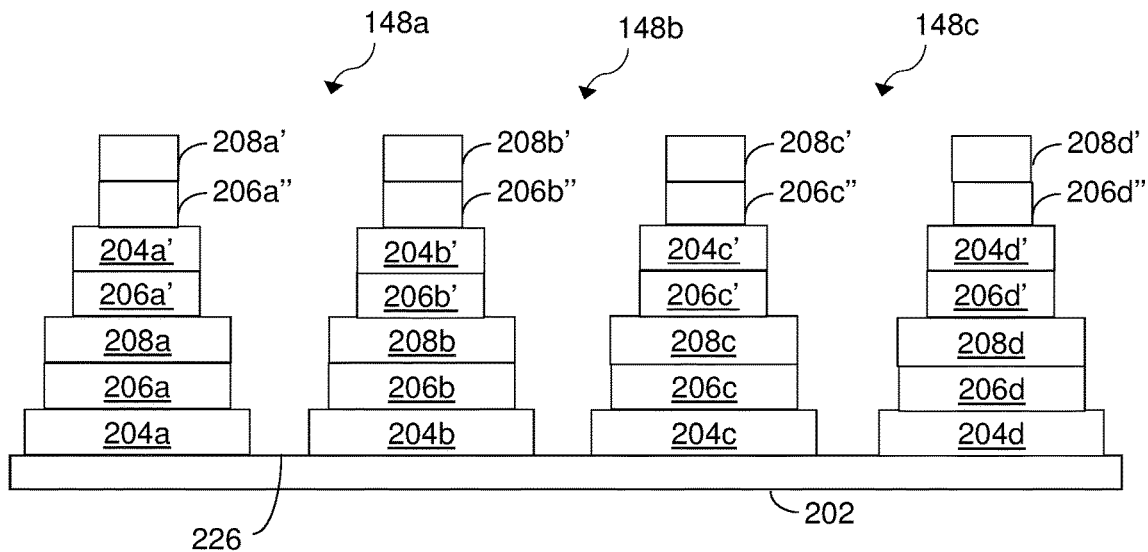

In FIG. 4b, first, second and third precursor grooves 148a, 148b, 148c are formed in a first side of the stack 200. The first, second and third precursor grooves 148a, 148b, 148c may be collectively referred to as precursor grooves 148. Similarly to FIG. 3, the first side of the stack 200 is for example opposite to a second side of the stack 200 which is in contact with a surface 226 of the substrate 202. A precursor groove is for example a groove which is formed, and which subsequently undergoes further processing (such as widening or partial filling with other elements) to form a subsequent groove. The precursor grooves may be formed using the same method or a similar method as that used for forming the grooves 128 of FIG. 3. For example, the precursor grooves may be formed using laser ablation or an alternative process such as photolithography.

Figure 4C:
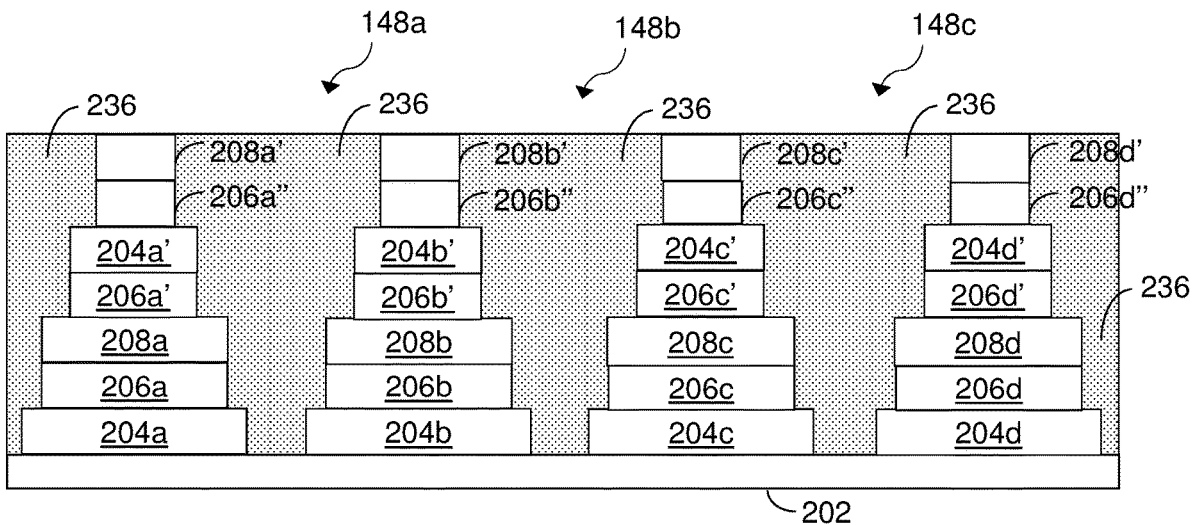

The precursor grooves 148 of FIG. 4b are formed with substantially the same depth as each other. This may simplify the formation of the precursor grooves 148. However, in other embodiments, one or more of the precursor grooves may be formed with a different depth than other precursor grooves. In FIG. 4c, each of the precursor grooves 148 is formed through the further second electrode layer 208', the second further electrolyte 206", the further first electrode layer 204', the first further electrolyte layer 206', the second electrode layer 208, the electrolyte layer 206, and the first electrode layer 204. However, in other examples, the precursor grooves 148 may be formed through different layers than this. Furthermore, in some cases, the stack 200 may include different layers than the stack 200 of FIG. 4. For example, the first further electrolyte layer 206' between the second electrode layer 208 and the further first electrode layer 206' may be omitted. A different layer (such as an insulating layer) may instead separate the second electrode layer 208 from the further first electrode layer 206'.

Figure 4D:
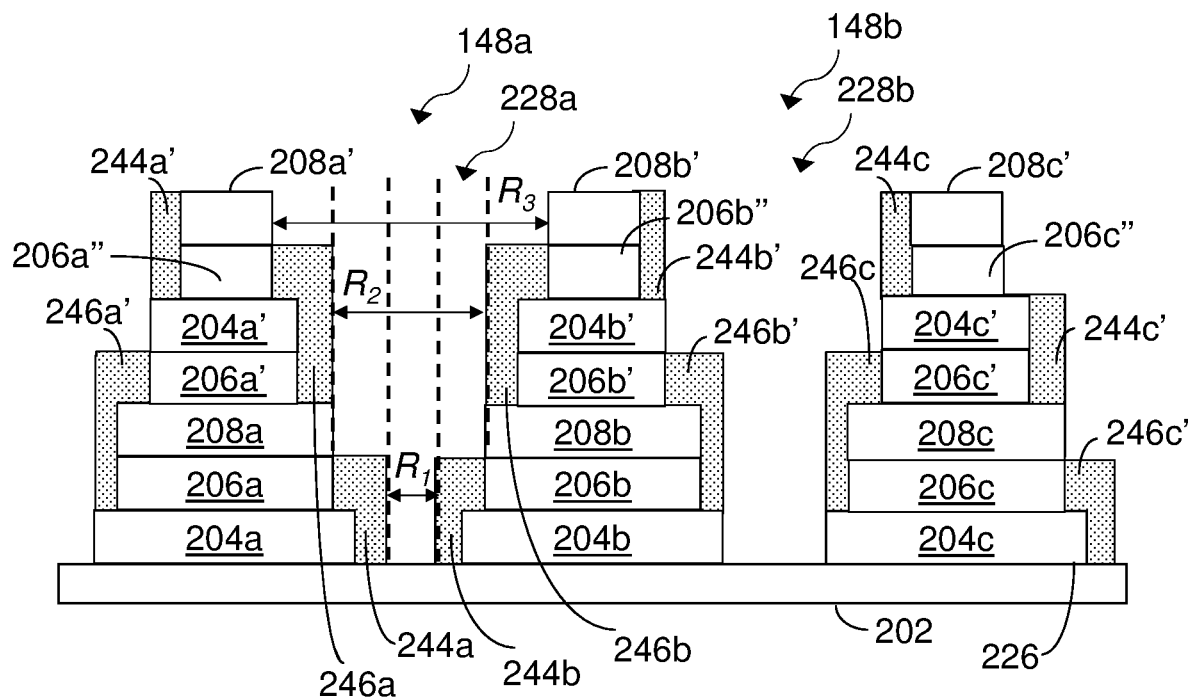

In some embodiments such as FIG. 4b, the precursor grooves 148 may have a stepped shape in cross-section, with a width of the precursor grooves increasing towards a mouth of the precursor grooves (for example in a direction away from the substrate 202). This allows particular layers to be revealed or otherwise exposed, e.g. for subsequent connection to electrically conductive material, as illustrated in FIG. 4d. However, the shape of the precursor grooves 148 of FIG. 4b is merely an example. In other examples, the precursor grooves 148 may have a different shape and/or size. For example, some or all of the precursor grooves 148 may instead have a constant cross-section, similarly to the grooves 128 of FIG. 3a.

FIG. 4c illustrates providing an electrically insulating material 236 in the precursor grooves 148. The electrically insulating material 236 may be provided as described with reference to FIG. 3b.

After providing the electrically insulating material 236, grooves 228 similar to the grooves 128 of FIG. 3 may be provided. This is shown schematically in FIG. 4d, which shows the formation of first and second grooves 228a, 228b (although it is appreciated that a third groove may be formed similarly to formation of the first groove 228a).

In FIG. 4d, the first groove 228a is formed through the electrically insulating material 236 in the first precursor groove 148a. The second groove 228b is formed through the electrically insulating material in the second precursor groove 148b. Although not shown in FIG. 4d, it is to be appreciated that the third groove may be formed through the electrically insulating material 236 in the third precursor groove 148c in a similar way to formation of the first groove 228a.

The electrically insulating material 236 removed to form the first and second grooves 228a, 228b of FIG. 4d may be removed in a similar way to removal of the electrically insulating material 136 to form the first and second grooves 128a, 128b of FIG. 3. For example, the first and second grooves 228a, 228b may be formed by laser ablating a portion of the electrically insulating material 236 or by using a different technique to remove the portion of the electrically insulating material 236.

The first groove 228a may be formed by first removing a first portion of the electrically insulating material 236 in a first region R1 of the first precursor groove 148a After removal of the first portion of the electrically insulating material 236, the electrically insulating material may be separated into first electrical insulators 244a, 244b which contact surfaces of first and second portions of the electrolyte layer 206a, 206b and surfaces of first and second portions of the first electrode layer 204a, 204b. In this way, the first electrical insulators 244a, 244b electrically insulate the first and second electrode layers 204, 208 from each other.

Subsequently, the first groove 228a may be widened by removing a second portion of the electrically insulating material 236 in a second region R2 of the first precursor groove 148a. The second region R2 is for example wider than the first region R1 in a direction parallel to a plane of the surface 226 of the substrate 202.

In the example of FIG. 4d, the second region R2 is sufficiently wide that removal of the second portion of the electrically insulating material 236 in the second region R2 exposes a surface of first and second portions 208a, 208b of the second electrode layer 208, within the first groove 228a. In this way, a first surface of the first groove 228a includes a first exposed surface of the second electrode layer 208, which in this case is an exposed surface of the first portion 208a of the second electrode layer 208.

Widening of the first groove 228a in this way leaves second electrical insulators 246a, 246b in contact with a surface of first and second portions 206a', 206b' of the first further electrolyte layer 206, respectively, within the first groove 228a. The second electrical insulators 246a, 246b also respectively contact a surface of first and second portions 204a' 204b' of the further first electrode layer 204 within the first groove 228a. The second electrical insulators 246a, 246b also remain in contact, respectively, with a surface of first and second portions 206a'', 206b'' of the second further electrolyte layer 206'' within the first groove 228a. This electrically insulates the first and second portions 204a', 204b' of the further first electrode layer 204' from the first and second portions 208a, 208b of the second electrode layer 208. In this way, surfaces of the first and second portions 204a', 204b' of the further first electrode layer 204, which for example correspond with sides or faces of the further first electrode layer 204 facing the first groove 228a, are insulated from the first groove 228a by the electrically insulating material 236. Similarly, surfaces of the first and second portions 208a', 208b' of the further second electrode layer 208, which for example correspond with sides or faces of the further first electrode layer 204 facing the first groove 228a, are insulated from the first groove 228a by the electrically insulating material 236. This surface of the first portion 208a' of the further second electrode layer 208 may be referred to as a first exposed surface of the further second electrode layer 208, as it may subsequently be exposed.

After removal of the second portion of the electrically insulating material 236, a third portion of the electrically insulating material 236 is removed in a third region R3 of the first precursor groove 148a. The third region R3 is for example wider than the first and second regions R1, R2 in a direction parallel to a plane of the surface 226 of the substrate 202. By removal of the third portion of the electrically insulating material 236 a surface of first and second portions 208a', 208b' of the further second electrode layer 208' within the first groove 228a are exposed. This exposes the first exposed surface of the further second electrode layer 208, for example. This allows the further second electrode layer 208' to be connected to an external circuit, for example via electrically conductive material deposited in contact with the first exposed surface of the further second electrode layer 208'.

As can be seen from FIG. 4d, after widening the first groove 228a, a first portion of the first groove 228a (for example between the first and second portions 204a, 204b of the first electrode layer 204) is narrower than a second portion of the first groove 228a (for example between the first and second portions 204a', 204b' of the further first electrode layer 204'). The first portion of the first groove 228a is for example closer to the substrate 202 than the second portion of the first groove 228a. Thus, the first groove 228a may for example widen in cross-section away from the substrate 202 (or towards a mouth of the first groove 228a). This may facilitate further processing of the stack 200, such as deposition of further components like an electrically conductive material. However, the shape of the first groove 228a of FIG. 4d is merely an example.

Similar processing may be applied to the second groove 228b as to the first groove 228a. However, as shown in FIG. 4d, a first portion of the electrically insulating material 236 removed during a first widening of the second groove 228b may be larger than the first portion of the electrically insulating material 236 removed during the first widening of the first groove 228a. In this way, an exposed surface of a second and third portion 204b, 204c of the first electrode layer 204 may be formed, within the second groove 228b, by removing the first portion of the electrically insulating material 236. For example, formation of the second groove 228b may include forming the second groove 228b through the electrically insulating material 236 in the second precursor groove 148b to form the second groove 228b with a second surface including an exposed surface of the first electrode layer 204 (which is for example the exposed surface of the second portion 204b of the first electrode layer 204). Conversely, a face or side of second and third portions 208b, 208c of the second electrode layer 208 may remain covered or otherwise insulated by the electrically insulating material 236 during formation of the second groove 228b. Similarly, a face or side of second and third portions 204a', 204b' of the further first electrode layer 204a' may be remain insulated by the electrically insulating material 236. In this way, what may be referred to as an exposed surface of the further first electrode layer 204a' (such as a surface of the second portion 204a' of the further first electrode layer 204a') may remain insulated from the second groove 228b by the electrically insulating material 236. However, a second widening of the second groove 228b, for example by removal of a second portion of the electrically insulating material 236 may reveal an exposed surface of second and third portions 204b', 204c' of the further first electrode layer 204' within the second groove 228b. In this way, the second surface of the second groove 228b may include the exposed surface of the further first electrode layer 204a'. A side or face of second and third portions 208b', 208c' of the further second electrode layer 208 may remain covered or otherwise insulated by the electrically insulating material 236.

A third groove may be formed through the third precursor groove 228c in a similar way to formation of the first groove 228a through the first precursor groove 228a. Hence, after formation of the first, second and third grooves in a stack 200 such as the stack 200 of FIG. 4, the first surface of the first groove 228a may include a first exposed surface of the further second electrode layer 208' as well as a first exposed surface of the second electrode layer 208. Similarly, the second surface of the second groove 228b may include an exposed surface of the further first electrode layer 204' as well as an exposed surface of the first electrode layer 204. The third surface of the third groove may include a second exposed surface of the further second electrode layer 208' as well as a second exposed surface of the second electrode layer 208.

Figure 4E:
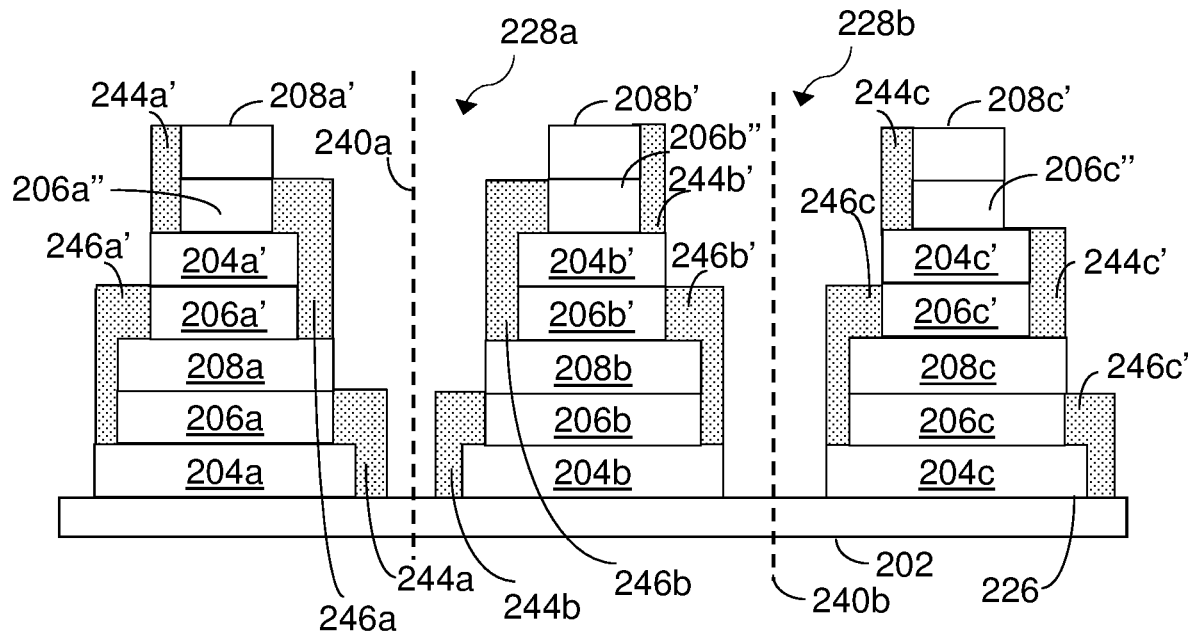

After formation of the first, second and third grooves in the stack 200, an intermediate structure of the stack 200 and the substrate 202 may be cut as shown in FIG. 4e. The cutting of the intermediate structure in FIG. 4e is similar to that of FIG. 3d. For example, the intermediate structure may be cut along first and second axes 240a, 240b (collectively referred to with the reference numeral 240) which are aligned with the first and second grooves 228a, 228b respectively. The intermediate structure may also be cut along a third axis aligned with the third groove.

Figure 4F:
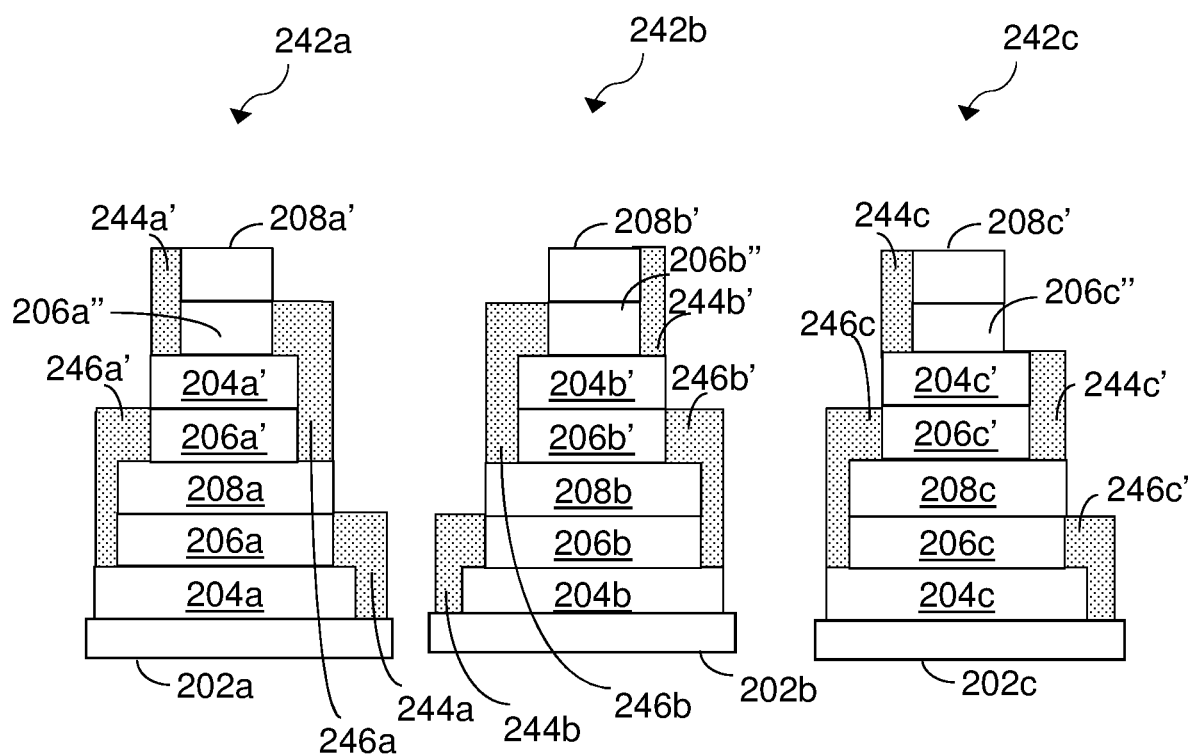

Cutting of the intermediate structure forms the three cells 242a-242c of FIG. 4f, collectively referred to with the reference numeral 242. The cells 242 may be connected together similarly to the connection of the cells 142 of FIG. 3e to form a multi-cell energy storage device.

The above embodiments are to be understood as illustrative examples. Further examples are envisaged. For example, a cell similar to the cells 142 of FIG. 3e may be formed using a similar method to that of FIG. 4, in which precursor grooves are formed, at least partly filled with an electrically insulating material before subsequent selective ablation of the electrically insulating material.

FIGS. 3d and 4e illustrate cutting of intermediate structures without undergoing a z-folding process, for ease of illustration. However, it is to be appreciated that, in some cases, intermediate structures similar to those of FIGS. 3d and 4e may undergo a z-folding process to form a z-fold arrangement as described with reference to FIG. 2 before subsequently undergoing cutting to separate the intermediate structures into cells. In such cases, the electrically insulating material 136, 236 in the grooves 128, 228 may be aligned in the z-fold arrangement. The intermediate structure may then be cut along an axis aligned with the electrically insulating material 136, 236 (which for example corresponds with an axis 140, 240 aligned with the grooves 128, 228). This may further improve the efficiency of the method by reducing the number of cutting operations compared with examples without the formation of such a z-fold arrangement.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method for manufacturing an energy storage device, the method comprising:
 providing a stack on a surface of a substrate, the stack comprising a first electrode layer, a second electrode layer, and an electrolyte layer between the first electrode layer and the second electrode layer, the first electrode layer closer than the second electrode layer to the surface of the substrate;
 forming a first groove in a first side of the stack, the first side of the stack opposite to a second side of the stack on the surface of the substrate, the first groove having a first depth and a first surface comprising a first exposed surface of the second electrode layer;
 forming a second groove in the first side of the stack, the second groove having a second depth different from the first depth and a second surface comprising a first exposed surface of the first electrode layer;
 forming a third groove in the first side of the stack, the third groove having a third depth the same as the first depth and a third surface comprising a second exposed surface of the second electrode layer, wherein the second groove is between the first groove and the third groove;
 providing a first electrical insulator in contact with the first exposed surface of the first electrode layer and a first exposed surface of the electrolyte layer without contacting at least a portion of the first exposed surface of the second electrode layer; and
 providing a second electrical insulator in contact with the second exposed surface of the second electrode layer and a second exposed surface of the electrolyte layer without contacting at least a portion of a second exposed surface of the first electrode layer.

2. The method of claim 1, wherein at least one of: the first groove, the second groove, or the third groove are formed without cutting the substrate.

3. The method of claim 1, wherein:
 the first groove is spaced apart from, and parallel to, the second groove; and
 the second groove is spaced apart from, and parallel to, the third groove.

4. The method of claim 1, wherein at least one of: the first depth of the first groove, the second depth of the second groove, or the third depth of the third groove is perpendicular to a plane of the surface of the substrate.

5. The method of claim 1, wherein forming the first groove, forming the second groove and forming the third groove uses at least one laser beam directed towards the first side of the substrate.

6. The method of claim 1, wherein:
 the first groove is formed through the second electrode layer and the electrolyte layer and exposes the first exposed surface of the second electrode layer;
 the second groove is formed through the second electrode layer, the electrolyte layer and the first electrode layer and exposes the first exposed surface of the first electrode layer; and
 the third groove is formed through the second electrode layer and the electrolyte layer and exposes the second exposed surface of the second electrode layer.

7. The method of claim 6, wherein:
 the first groove is formed without cutting the first electrode layer and without cutting the substrate;
 the second groove is formed without cutting the substrate; and
 the third groove is formed without cutting the first electrode layer and without cutting the substrate.

8. The method of claim 1, comprising providing an electrically insulating material in at least one of:
 the first groove, to insulate the first exposed surface of the second electrode layer from the first electrode layer;
 the second groove, to insulate the first exposed surface of the first electrode layer from the second electrode layer; or
 the third groove, to insulate the second exposed surface of the second electrode layer from the first electrode layer.

9. The method of claim 8, comprising, after providing the electrically insulating material in the second groove, removing a portion of the electrically insulating material to expose a third exposed surface of the second electrode layer.

10. The method of claim 1, comprising:
 forming, in the first side of the stack, a first precursor groove, a second precursor groove and a third precursor groove; and
 providing an electrically insulating material in the first precursor groove, the second precursor groove and the third precursor groove, wherein:
 the first groove is formed through the electrically insulating material in the first precursor groove;
 the second groove is formed through the electrically insulating material in the second precursor groove; and
 the third groove is formed through the electrically insulating material in the third precursor groove.

11. The method of claim 10, wherein the first precursor groove, the second precursor groove and the third precursor groove are formed having the same depth as each other.

12. The method of claim 10, wherein:
 the stack comprises a further first electrode layer, a further second electrode layer and a further electrolyte layer between the further first electrode layer and the further second electrode layer, the further first electrode layer located between the second electrode layer and the further electrolyte layer; and at least one of:

forming the first groove comprises:
forming the first groove through the electrically insulating material in the first precursor groove to form the first groove with the first surface comprising the first exposed surface of the second electrode layer and such that a first exposed surface of the further second electrode layer is insulated from the first groove by the electrically insulating material; and
widening the first groove such that the first surface further comprises the first exposed surface of the further second electrode layer;
forming the second groove comprises:
forming the second groove through the electrically insulating material in the second precursor groove to form the second groove with the second surface comprising the first exposed surface of the first electrode layer and such that an exposed surface of the further first electrode layer is insulated from the second groove by the electrically insulating material; and
widening the second groove such that the second surface further comprises the exposed surface of the further first electrode layer; or
forming the third groove comprises:
forming the third groove through the electrically insulating material in the third precursor groove to form the third groove with the third surface comprising the second exposed surface of the second electrode layer and such that a second exposed surface of the further second electrode layer is insulated from the third groove by the electrically insulating material; and
widening the third groove such that the third surface further comprises the second exposed surface of the further second electrode layer.

13. The method of claim 12, wherein at least one of:
after widening the first groove, a first portion of the first groove is narrower than a second portion of the first groove, the first portion of the first groove closer than the second portion of the first groove to the first side of the substrate;
after widening the second groove, a first portion of the second groove is narrower than a second portion of the second groove, the first portion of the second groove closer than the second portion of the second groove to the first side of the substrate; and
after widening the third groove, a first portion of the third groove is narrower than a second portion of the third groove, the first portion of the third groove closer than the second portion of the third groove to the first side of the substrate.

14. The method of claim 12, wherein:
the stack comprises an additional first electrode layer, an additional second electrode layer and an additional electrolyte layer between the additional first electrode layer and the additional second electrode layer, the additional first electrode layer located between the additional second electrode layer and the additional electrolyte layer; the first precursor groove, the second precursor groove, and the third precursor groove are each formed through the additional second electrode layer, the additional electrolyte layer, the additional first electrode layer, the second electrode layer, the electrolyte layer, and the first electrode layer.

15. The method of claim 1, wherein:
the stack comprises a further first electrode layer, a further second electrode layer and a further electrolyte layer between the further first electrode layer and the further second electrode layer, the further first electrode layer located between the second electrode layer and the further electrolyte layer; and at least one of:
the first surface comprises a first exposed surface of the further second electrode layer;
the second surface comprises an exposed surface of the further first electrode layer; or
the third surface comprises a second exposed surface of the further second electrode layer.

16. The method of claim 1, wherein a first distance between the first groove and the second groove, in a direction parallel to a plane of the substrate, is the same as a second distance between the second groove and the third groove, in the direction parallel to the plane of the substrate.

17. An energy storage device comprising:
a stack on a surface of a substrate, the stack comprising:
a first electrode;
a second electrode; and
an electrolyte between the first electrode and the second electrode, the first electrode closer than the second electrode to the surface of the substrate;
a first electrical insulator in contact with a first exposed surface of the first electrode and a first exposed surface of the electrolyte without contacting at least a portion of a first exposed surface of the second electrode; and
a second electrical insulator in contact with a second exposed surface of the second electrode and a second exposed surface of the electrolyte without contacting at least a portion of a second exposed surface of the first electrode.

18. The energy storage device of claim 17, wherein the first electrical insulator is arranged at a first side of the stack and the second electrical insulator is arranged at a second side of the stack, opposite to the first side.

19. The energy storage device of claim 18, wherein the first side of the stack and the second side of the stack are each perpendicular to a plane of the surface of the substrate.

20. The energy storage device of claim 17, wherein a thickness of the substrate in a direction perpendicular to a plane of the surface of the substrate is the same as or larger than a thickness of the stack in the direction perpendicular to the plane of the surface of the substrate.

21. The energy storage device of claim 17, wherein the stack comprises:
a further first electrode;
a further second electrode; and
a further electrolyte between the further first electrode and the further second electrode, the further first electrode located between the second electrode and the further electrolyte,
wherein the energy storage device comprises:
a further first electrical insulator in contact with a first exposed surface of the further first electrode and a first exposed surface of the further electrolyte without contacting at least a portion of a first exposed surface of the further second electrode; and
a further second electrical insulator in contact with a second exposed surface of the further second electrode and a second exposed surface of the further electrolyte without contacting at least a portion of a second exposed surface of the further first electrode.

* * * * *